United States Patent [19]
Thomas

[11] Patent Number: 5,429,893
[45] Date of Patent: Jul. 4, 1995

[54] ELECTROCHEMICAL CAPACITORS HAVING DISSIMILAR ELECTRODES

[75] Inventor: George Thomas, Plantation, Fla.

[73] Assignee: Motorola, Inc., Schaumburg, Ill.

[21] Appl. No.: 191,910

[22] Filed: Feb. 4, 1994

[51] Int. Cl.$^6$ .................. H01M 4/58; H01G 9/00
[52] U.S. Cl. ................................ 429/218; 429/221;
429/223; 429/224; 429/233; 429/236; 429/194;
429/197; 361/502
[58] Field of Search ............... 429/194, 197, 218, 221,
429/223, 224, 233, 236; 361/502

[56] References Cited

U.S. PATENT DOCUMENTS 3,700,975 10/1972 Butherus et al. .................. 361/502
5,260,855 11/1993 Kaschmitter et al. ............. 361/502
5,351,164 9/1994 Grigortchak et al. ............. 361/502

FOREIGN PATENT DOCUMENTS 1196683 11/1985 Canada .

*Primary Examiner*—John Niebling
*Assistant Examiner*—Bruce F. Bell
*Attorney, Agent, or Firm*—Kenneth M. Massaroni

[57] ABSTRACT

The invention provides for an improved pseudocapacitive device (10) having dissimilar electrodes (20) and (40). The first electrode (20) stores electrochemical charge via a double layer electrochemical mechanism, while the second electrode stores electrochemical charge via an oxidation/reduction reaction.

16 Claims, 5 Drawing Sheets

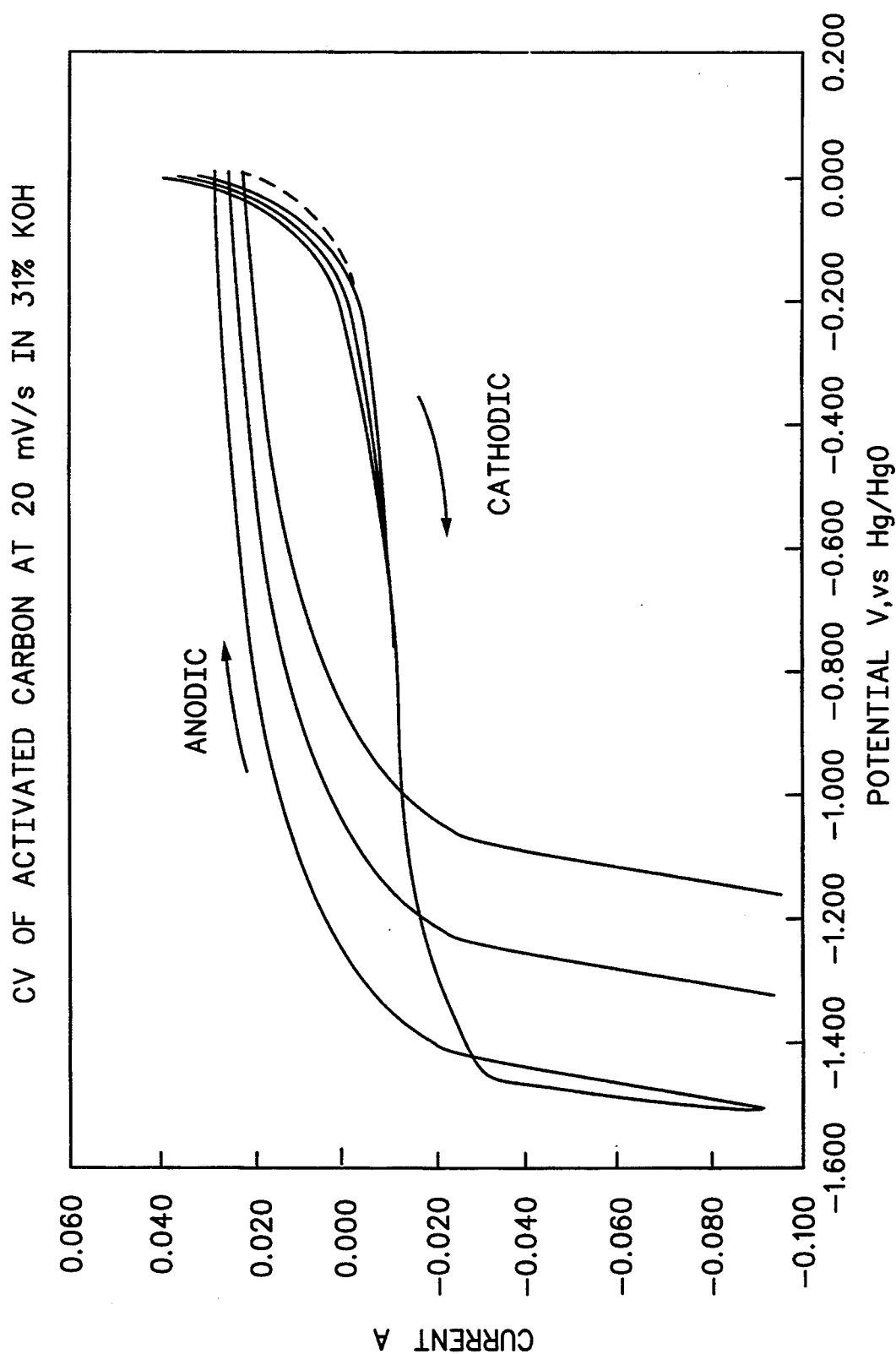

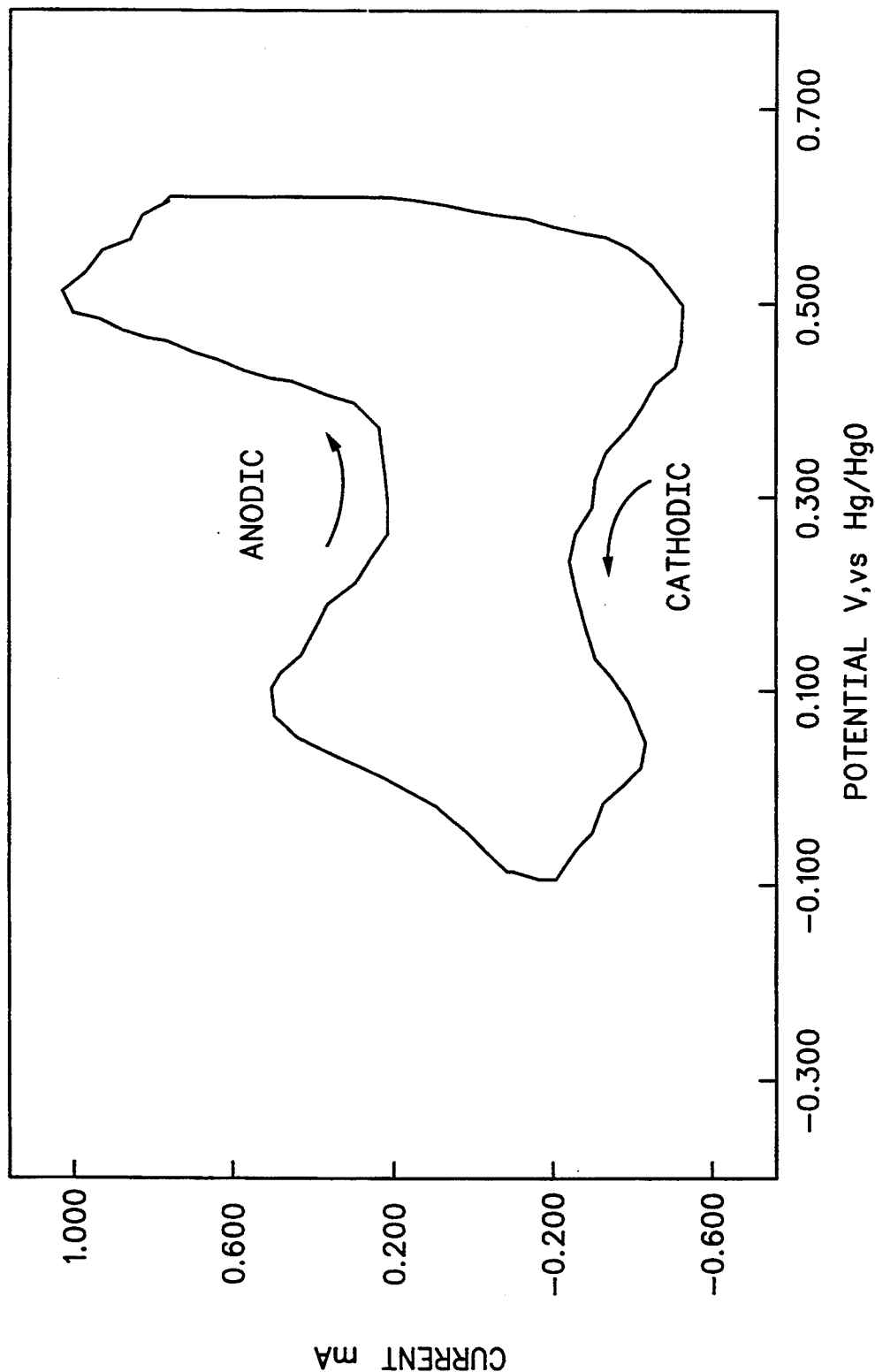

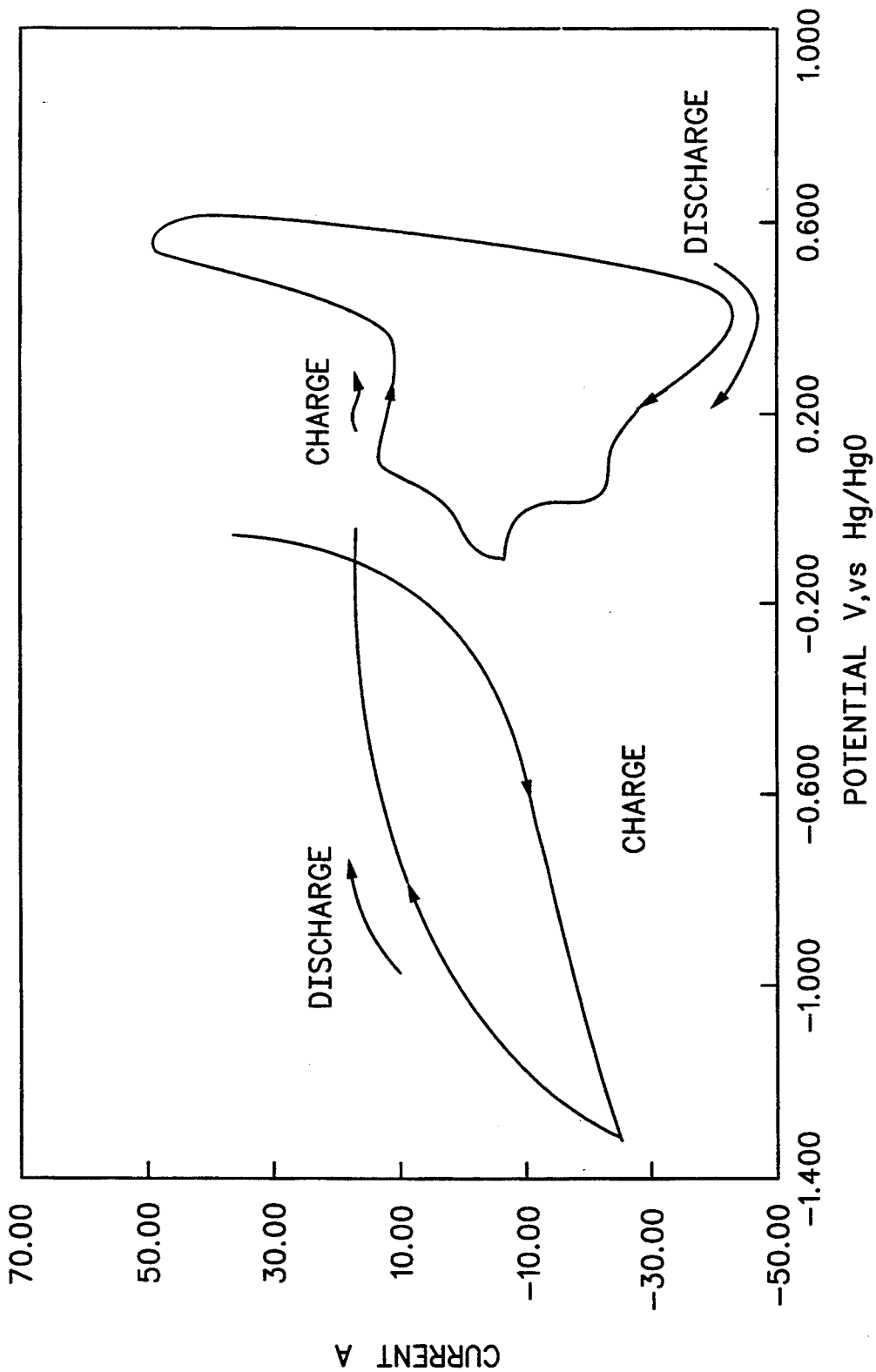

ELECTROCHEMICAL CAPACITORS HAVING DISSIMILAR ELECTRODES

TECHNICAL FIELD

This invention relates in general to the field of electrochemical capacitors, and more particularly, to electrochemical pseudocapacitor electrodes.

BACKGROUND

Electrochemical capacitors are a class of high rate energy storage/discharge devices, which use electrolytes and electrodes of various kinds, in a system similar to that of conventional batteries. Electrochemical capacitors, like batteries, are essentially energy storage devices. However, unlike batteries, they rely on charge accumulation at the electrode/electrolyte interface to store energy. Charge storage in capacitors therefore, is a surface phenomena. Conversely, charge storage in batteries is a bulk phenomena, occurring within the bulk of the electrode material.

The energy ($E_s$) stored by electrochemical capacitors can be described by the following formula:

$$E_s = \tfrac{1}{2} CV^2$$

Where C is storage capacitance, and V is cell voltage. It is therefore possible to increase the energy stored in the electrochemical capacitor by increasing the cell voltage (V), the storage capacitance (C), or both.

Several methods are currently known in the art for increasing the amount of energy stored in an electrochemical capacitor. One such method is to increase the surface area of the active electrode. To this end, porous, spongy, and foam substrates have been proposed and demonstrated to increase the storage capacity. High surface area electrodes result in an increase in storage capacitance, and thus increased stored energy. However, the energy density, i.e., energy per unit volume, is generally lower than for non-porous electrodes since the volume-to-area ratio for porous structures is generally high.

Another known approach for increasing stored energy involves using different types of material for fabricating the capacitor's electrodes. Carbon electrodes are used in the most popular commercial capacitors, while precious metal oxide electrodes are used in a relatively new class of capacitors known as pseudocapacitors. The phenomena known as pseudocapacitance was first identified by Professor Brian Conway. Pseudocapacitor devices are disclosed in, for example, Canadian Patent No. 1,270,296 issued to Dwight Craig.

Pseudocapacitors are surface energy storage devices. Under this general category, reside two subcategories of capacitors: double layer capacitors in which the interfacial capacitance at the electrode/electrolyte interface can be modeled as two parallel sheets of charge; and true pseudocapacitors in which charge transfer between the electrolyte and the electrode occurs over a wide potential range, and is the result of primary, secondary, and tertiary oxidation/reduction reactions between the electrode and electrolyte.

Double layer electrochemical capacitors are typically fabricated from relatively inexpensive materials, such as carbon. Capacitance of such electrodes is typically on the order of approximately 3–30 $\mu F/cm^2$. Conversely, pseudocapacitive devices demonstrating the redox mechanism are typically fabricated from precious metal oxide electrodes. These electrodes, while having higher capacitance (i.e. on the order of approximately 150–300 $\mu F/cm^2$) are prohibitively expensive.

Moreover, using similar materials for both electrodes of a capacitive device results in incomplete use of the electrodes. This is because, during the charge/discharge process, material on one of the electrodes will be reduced while the material of the other electrode is being oxidized. Thus, since both electrodes are fabricated of the same material, during cell discharge the cell voltage reaches zero volts when half of the material in each electrode is utilized. Hence only half the energy stored in the electrode is delivered.

Accordingly, there exists a need to develop an electrochemical capacitor which provides a high capacity per unit weight for energy storage without compromising the volume-to-area ratio of the cell. Moreover, in order to provide for reasonably priced commercial applications, the device should be fabricated of readily available, commercial materials, or at least minimize the use of exotic, high priced materials.

SUMMARY OF THE INVENTION

Briefly, according to the invention, there is provided a high energy density, electrochemical, pseudocapacitive device having a first electrode which stores charge using a double layer electrochemical mechanism, and a second electrode fabricated of an inorganic material, which stores charge via an oxidation/reduction ("redox") reaction. Operatively disposed between the first and second electrodes of the device is an electrolyte material adapted to facilitate charge transfer.

The inorganic redox material electrode may be fabricated of materials selected from the group of materials consisting of ruthenium, rhodium, palladium, osmium, iridium, cobalt, nickel, manganese, iron, platinum, alloys and oxides of the same, and combinations thereof. Moreover, the inorganic redox electrode may be assembled from a reduced form of the inorganic material. The first electrode (i.e., the electrode demonstrating a double layer electrochemical mechanism) is typically fabricated of materials selected from the group of materials consisting of vitreous carbon, activated carbon, petroleum coke, and combinations thereof. The electrolyte material disposed between the first and second electrodes may be either an aqueous, or non-aqueous electrolyte. Examples of non-aqueous electrolytes include: propylene carbonate ("PC")/dimethoxyethanol (DME)/LiAsF$_6$, PC/DME/(CH$_3$)$_4$ClO$_4$, PC/DME/LiClO$_4$. Examples of aqueous electrolytes include: KOH/H$_2$O, LiOH/H$_2$O, NaClO$_4$/LiOH/H$_2$O, NaOH/H$_2$O, H$_2$SO$_4$/H$_2$O, HClO$_4$/H$_2$O, and combinations thereof.

BRIEF DESCRIPTION OF THE DRAWINGS

FIG. 4 is a cyclic voltammogram illustrating the behavior of a carbon-based electrode.

FIG. 5 is a cyclic voltammogram illustrating the behavior of an inorganic redox electrode; and FIG. 6 is a cyclic voltammogram illustrating the comparative behavior of the electrodes of FIGS. 4 and 5.

DETAILED DESCRIPTION OF THE PREFERRED EMBODIMENT

Figure 1:
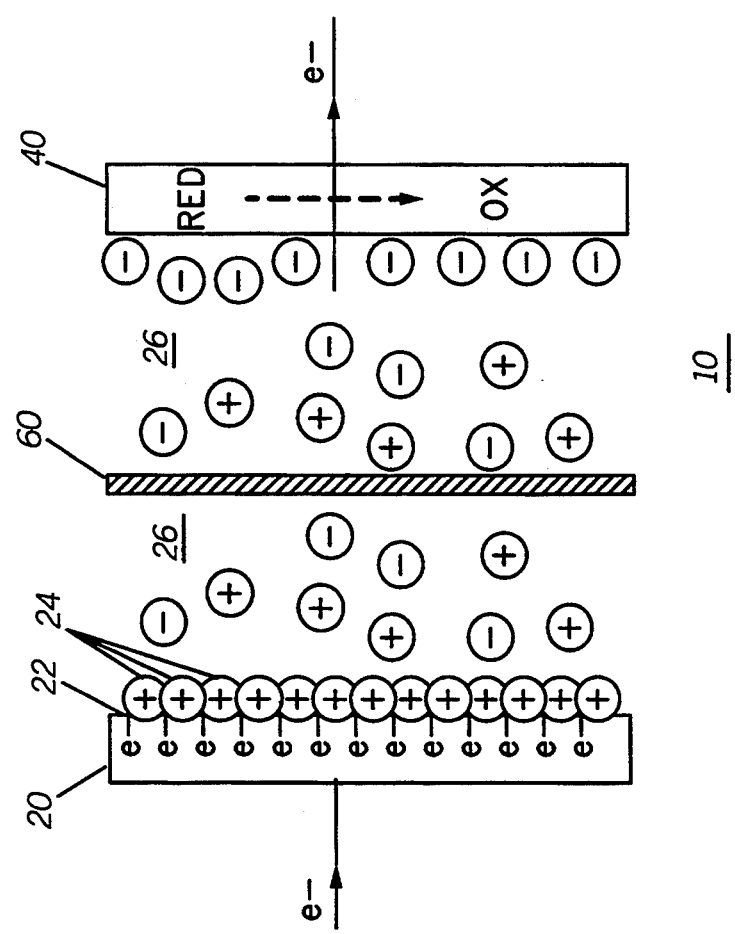
FIG. 1 is a schematic representation of a high energy density electrochemical pseudocapacitive device in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic representation of a high energy density electrochemical pseudocapacitive device 10 in accordance with the instant invention. The device 10 includes a first electrode 20, a second electrode 40 and a separator 60 operatively disposed between said first and second electrodes. Also disposed between the electrodes 20, 40, is an electrolyte 26 which may be either aqueous or non-aqueous.

In one embodiment, the first electrode 20 is the negative electrode, and demonstrates double layer electrochemical behavior. Specifically, and as is illustrated in greater detail hereinbelow with respect to FIG. 2, upon charging, charge carriers (specifically electrons) accumulate at an interface region 22 at the surface of the electrode 20 in contact with the electrolyte 26. Positive ions 24 from the electrolyte migrate to the interfacial region 22, accumulating on the electrode 20 surface. The result is the buildup of two layers of charge carriers: a layer of negative charge formed by the migration of electrons to the electrode/electrolyte interface 22, and a second layer formed by the migration of positive ions to the interfacial region 22 from the electrolyte.

The second or positive electrode, electrochemically speaking, demonstrates pseudocapacitive behavior. That is, progressive oxidation/reduction reactions take place at the second electrode 40.

The separator 60 may be operatively disposed between the first 20 and second 40 electrodes, and may be fabricated of, for example, porous polypropylene. The electrolyte may be either an aqueous or non-aqueous electrolyte, and may be materials such as $LiOH/H_2O$, $KOH/H_2O$, $H_2SO_4/H_2O$, $PC/DME/LiAsF_6$, $PC/DME/(CH_3)_4ClO_4$, $PC/DME/LiClO_4$, and combinations thereof.

Figure 2:
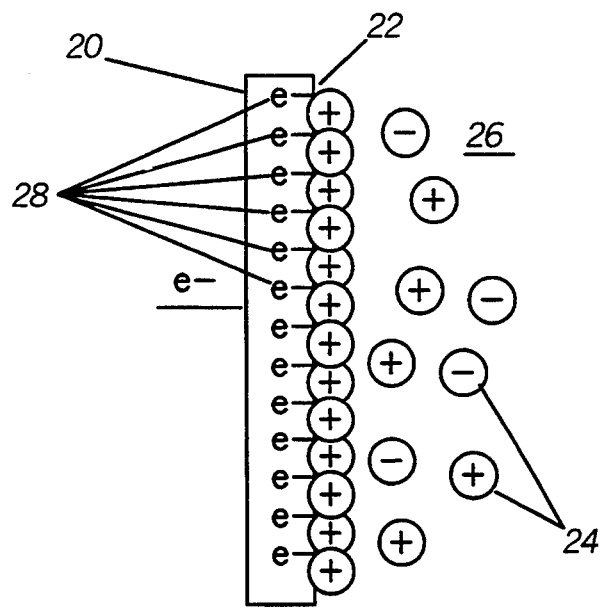
FIG. 2 is a schematic representation of the electrochemical mechanism which takes place at one electrode of a device in accordance with the invention.

Referring now to FIG. 2, there is illustrated therein a schematic representation of the first electrode of a high energy density electrochemical pseudocapacitor device in accordance with the instant invention. The first electrode is characterized by its ability to store charge via the double layer electrochemical mechanism. FIG. 2 illustrates an electrode 20 fabricated of materials selected from the group of materials consisting of activated carbon, petroleum coke, vitreous carbon, and combinations thereof. The electrode 20 is in intimate contact with the electrolyte 24, as described hereinabove and creates an interface region 22 between the electrode 20 and the electrolyte 26. The double layer mechanism which characterizes this electrode arises because a double layer of charged carriers builds up at the interface 22.

Specifically, at the interface of the electrode/electrolyte on the electrode side thereof, a layer of electrons 28 is built up. On the other side of the electrode/electrolyte interface 22, i.e. in the electrolyte, a layer of positively charged ions is built up. As a result, two layers of charge carriers 24 and 28 are built up and results in the double layer. The voltage of the electrode increases with charge accumulation. In connection with the double capacitance phenomena, no charge transfer (Faradaic) process occurs at the electrode/electrolyte interface. During discharge, the charge stored at the interface is released. The charge/discharge rate is generally determined by the nature and type of the material, and the electrolyte. High surface area carbon, such as disclosed above, is used to achieve higher energy storage capability.

Figure 3:
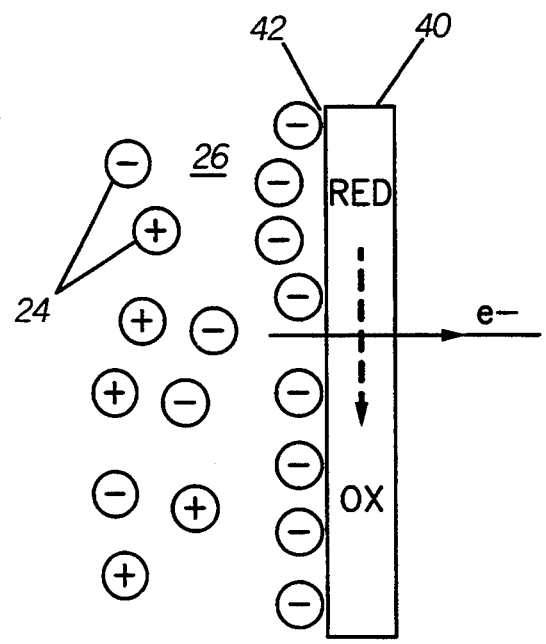
FIG. 3 is a schematic representation of the electrochemical mechanism which takes place at the second electrode of a device in accordance with the invention.

Referring now to FIG. 3, there is illustrated therein the second electrode of a electrochemical pseudocapacitive device in accordance with the instant invention. This electrode may not be characterized by the double layer phenomena described hereinabove with respect to FIG. 2. Rather, charge transfer is as a result of primary, secondary, tertiary, and higher order oxidation/reduction reactions. Pseudocapacitance is a phenomena which is known to occur at the electrode/electrolyte interface, and is attributable to surface electrochemical processes. It is observed when a material undergoes kinetic and/or thermo-dynamically reversible singular or multiple redox processes over a wide potential range. Energy is stored and released by the reduction of the oxidized species, and its subsequent oxidation as in conventional rechargeable cells. The electrode 40 is fabricated of a material selected from the group consisting of Ru, Rh, Pd, Os, Ir, Co, Ni, Mn, Fe, Pt, and alloys and oxides of the same, and combinations thereof. The electrode of FIG. 3 illustrates a discharged state, though it is to be understood that this electrode may also be used in a charging state. In this case, as the electrode is discharged, oxidation of the metal ion of the electroactive material takes place concurrent with the polarization of the electrode, and accumulation of negative charge as part of the double layer formation. It is to be be noted that all pseudocapacitive materials demonstrate some degree of double layer capacitance.

The pseudocapacitive mechanism by which the compounds from which the electrode is formed can be illustrated in the following formula:

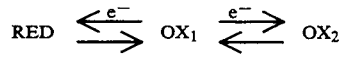

This reaction is represented in FIG. 3 by arrow 44. Moreover the oxidation reduction process occurs over a relatively wide voltage range.

EXAMPLE

Using the invention as discussed hereinabove, an electrochemical pseudocapacitive device was fabricated. The first electrode, i.e., the electrode fabricated from a carbon based material and characterized by a double layer electrochemical mechanism, was formed as the anode, and was made from a carbonaceous material. The carbonaceous material specifically activated carbon was finely powdered and pressed to form a pellet using standard techniques. A teflon binder material was used with the carbonaceous material to assist in forming the pellet. It is to be noted that other binder materials may also be used, i.e., teflon and water or organic materials such as two percent EDPM in hexane, ten percent polyvinylidene fluoride solution and n-nmethylpyrrolidinone. The activated carbon was mixed with a teflon solution in water (thirty percent by weight) in a mortar and pressed into a pellet with approximately five thousand psi pressure. The pellet was then attached to a silver current collector using a conductive epoxy material.

The double layer capacitance of the carbon pellet was then determined by using cyclic voltammogram experimentation. As illustrated in FIG. 4, this electrode exhibited a capacitance up to approximately −1.4 Volts versus the Hg/Hgo electrode at which hydrogen evolution predominates. The carbon electrode was cycled at between 0 and −1.3 Volts to determine capacitance. The capacitance observed for the electrode prepared in this manner was approximately 2.7 F/g.

Cyclic voltammograms were measured by using a three electrode assembly with carbon being the working electrode (WE), a platinum gauze as a counter-electrode (CE), and Hg/HgO as the reference electrode (RE) respectively in 31% KOH solution at room temperature. A computer controlled EG & G Parc model 270 electrochemical system was used to run cyclical potammogramic experiments. The voltammograms were recorded at various scan rates from 20 to 200 mV/s.

The second electrode (i.e. the cathode), the electrode characterized as being fabricated from an inorganic redox material was prepared from cobalt metal. A circular disc of cobalt was cut from a high purity cobalt foil (0.1 millimeters thick and 1 centimeter diameter) and welded to a silver wire current collector. Since silver is electrochemically active in the potential region of interest (0 to 0.6 Volts versus Hg/HgO), the silver was masked with a non-reactive insulating material. The entire assembly was then dipped into the KOH solution, and a pseudocapacitive oxide was grown to desired thickness via the combined action of soaking in the KOH solution, and periodic potential sweeps of between −0.8 and +0.6 volts versus the reference electrode, for a period of approximately 5 days. The growth of the pseudocapacitive cobalt oxide was monitored by cyclical voltammogrammic experiments.

A typical cyclic voltammogram recorded at 100 mV/S is shown in FIG. 5. As may be appreciated from FIG. 5, two sets of anodic and cathotic peaks are illustrated as almost mirror images, even at relatively high sweep rates. This behavior is indicative of pseudocapacitance. The CV shown in FIG. 5 has two sets of peaks indicative of the presence of two redox species having chemical potentials separated by approximately 400 mV. The electrochemical activity is spread over the entire 700 mV range, indicating another requirement of pseudocapacitance (i.e. behavior over relatively large electrochemical potential ranges). The first oxidation peak is believed to be due to the oxidation of cobalt hydroxide to oxyhydroxide. The second oxidation peak corresponds to the further oxidation of the oxyhydroxide.

As illustrated in FIG. 5, cobalt oxide may serve as the cathode for the instant invention while an activated carbon electrode can serve as the anode. This becomes more evident in FIG. 6, in which the CV of the carbon and cobalt oxide electrodes are overlayed. As seen in FIG. 6, there is a voltage separation between the two electrodes, and the voltage of carbon moves cathodically during charge, while the cobalt oxide moves positively. Accordingly, a fully charged cell will have voltage of approximately 1.8 volts as opposed to a capacitor built with similar materials as both electrodes. Higher cell voltage translates into higher energy density of the electrochemical/pseudocapacitant cell.

While the preferred embodiments of the invention had been illustrated and described, it will be clear that the invention is not so limited. Numerous modifications, changes, variations, substitutions and equivalents will occur to those skilled in the art without departing from the spirit or scope of the present invention as defined by the appended claims.

What is claimed is:

1. A high energy density, electrochemical capacitor device, said capacitor device comprising:

a first electrode fabricated of a carbon-based material, and said electrode stores charge via a double layer electrochemical mechanism;

a second electrode fabricated of an inorganic redox material selected from the group of materials consisting of Ru, Rh, Pd, Os, Ir, Co, Ni, Mn, Fe, Pt, Ru alloys, Rh alloys, Pd alloys, Os alloys, Ir alloys, Co alloys, Ni alloys, Fe alloys, Pt alloys, Ru oxides, Rh oxides, Pd oxides, Os oxides, Ir oxides, Co oxides, Ni oxides, Mn oxides, Fe oxides, Pt oxides, and combinations thereof; and an electrolyte disposed between said first and second electrodes.

2. A device as defined in claim 1, wherein said electrolyte is a non-aqueous electrolyte.

3. A device as defined in claim 2, where said non-aqueous electrolyte is selected from the group of materials consisting of propylene carbonate/dimethoxyethanol/LiAsF$_6$, propylene carbonate/dimethoxyethanol/(CH$_3$)$_4$, ClO$_4$, propylene carbonate/dimethoxyethanol/LiClO$_4$, and combinations thereof.

4. A device as defined in claim 1, where said electrolyte is an aqueous electrolyte.

5. A device as defined in claim 4, wherein said aqueous electrolyte is selected from the group of materials consisting of KOH/H$_2$O, LiOH/H$_2$O, NaClO$_4$/LiOH/H$_2$O, NaOH/H$_2$O, H$_2$SO$_4$/H$_2$O, HClO$_4$/H$_2$O, and combinations thereof.

6. A high energy density electrochemical capacitor device comprising:

first and second electrodes formed of dissimilar materials, and characterized by different charge storage mechanisms, wherein said second electrode is fabricated of an inorganic redox material selected from the group of materials consisting of Ru, Rh, Pd, Os, Ir, Co, Ni, Mn, Fe, Pt, Ru alloys. Rh alloys, Pd alloys Os alloys, Ir alloys, Co alloys, Ni alloys, Fe alloys, Pd alloys, Ru oxides, Rh oxides, Pd oxides. Os oxides, Ir oxides, Co oxides, Ni oxide, Mn oxides, Fe oxides, Pt oxides, and combinations thereof; and an electrolyte material disposed between said electrodes to facilitate charge transfer.

7. A device as defined in claim 6 wherein said first electrode is stores charge via a double layer electrochemical mechanism.

8. A device as in claim 7 wherein said first electrode is fabricated of a carbon based material selected from a group of materials consisting of activated carbon, petroleum coke, vitreous carbon, and combinations thereof.

9. A device as in claim 6 one said electrolyte is a non-aqueous electrolyte.

10. A device as in claim 6 wherein said electrolyte is an aqueous electrolyte.

11. A high energy density electrochemical capacitor device, said capacitor device comprising:

a first electrode fabricated of a carbon base material selected from the group of materials consisting of activated carbon, petroleum coke, vitreous carbon, and combinations thereof, and said electrode stores charge via a double layer electrochemical mechanism;

a second electrode fabricated of an inorganic redox material; and an electrolyte disposed between said first and second electrodes.

12. A device as defined in claim 11, wherein said inorganic redox electrode is fabricated of materials selected from the group of materials consisting of Ru, Rh, Pd, Os, Ir, Co, Ni, Mn, Fe, Pt, Ru alloys, Rh alloys, Pd alloys, Os alloys, Ir alloys, Co alloys, Ni alloys, Fe alloys, Pt alloys, Ru oxides, Rh oxides, Pd oxides, Os oxides, Ir oxides, Co oxides, Ni oxides, Mn oxides, Fe oxides, Pt oxides, and combinations thereof.

13. A device as defined in claim 11, wherein said electrolyte is a non-aqueous electrolyte.

14. (new) A device as defined in claim 13, wherein said non-aqueous electrolyte is selected from the group of materials consisting of propylene carbonate/dimethoxyethanol/$LiAsF_6$, propylene carbonate/dimethoxyethanol/$(CH_3)_4$, $ClO_4$, propylene carbonate/dimethoxyethanol/$LiClO_4$, and combinations thereof.

15. A device as defined in claim 11, wherein said electrolyte is an aqueous electrolyte.

16. A device as defined in claim 15 wherein said aqueous electrolyte is selected from the group of materials consisting of $KOH/H_2O$, $LiOH/H_2O$, $NaClO_4/LiOH/H_2O$, $NaOH/H_2O$, $H_2SO_4/H_2O$, $HClO_4/H_2O$, and combinations thereof.

* * * * *

UNITED STATES PATENT AND TRADEMARK OFFICE
CERTIFICATE OF CORRECTION

PATENT NO. : -- 5,429,893
DATED : -- July 4, 1995
INVENTOR(S) : -- Thomas, George It is certified that error appears in the above-indentified patent and that said Letters Patent is hereby corrected as shown below:

Column 6, Line 49 delete period between "alloys" and "Rh" and insert there -- , --

Column 6, Line 51  insert a comma between "oxides" and "Os" oxides

Column 6, Line 57,  between "electrode" and "stores" delete "[is]"

Column 8, Line 5,  after 14. delete "[new]"

Signed and Sealed this

Fourteenth Day of November, 1995

Attest:

BRUCE LEHMAN

Attesting Officer    Commissioner of Patents and Trademarks